(12) United States Patent
Tanaka

(10) Patent No.: US 12,347,884 B2
(45) Date of Patent: Jul. 1, 2025

(54) BATTERY PACK

(71) Applicant: MAKITA CORPORATION, Anjo (JP)

(72) Inventor: Kazuya Tanaka, Anjo (JP)

(73) Assignee: MAKITA CORPORATION, Anjo (JP)

(*) Notice: Subject to any disclaimer, the term of this patent is extended or adjusted under 35 U.S.C. 154(b) by 778 days.

(21) Appl. No.: 17/585,951

(22) Filed: Jan. 27, 2022

(65) Prior Publication Data

US 2022/0263178 A1 Aug. 18, 2022

(30) Foreign Application Priority Data

Feb. 17, 2021 (JP) ................................ 2021-023169

(51) Int. Cl.
*H01M 50/247* (2021.01)
*H01M 50/213* (2021.01)
*H01M 50/262* (2021.01)

(52) U.S. Cl.
CPC ....... *H01M 50/247* (2021.01); *H01M 50/213* (2021.01); *H01M 50/262* (2021.01); *H01M 2220/30* (2013.01)

(58) Field of Classification Search
CPC ............. H01M 50/204; H01M 50/213; H01M 50/244; H01M 50/247; H01M 50/262; H01M 50/289; H01M 2220/30
See application file for complete search history.

(56) References Cited

U.S. PATENT DOCUMENTS

| | | | |
|---|---|---|---|
| 2010/0129701 A1 | 5/2010 | Murayama et al. | |
| 2013/0136956 A1* | 5/2013 | Nakano | H01M 50/519 |
| | | | 429/7 |
| 2014/0302353 A1 | 10/2014 | Ogura | |
| 2020/0176834 A1* | 6/2020 | Murakami | H01M 10/6235 |
| 2022/0288766 A1* | 9/2022 | Murui | H01M 50/213 |
| 2023/0361409 A1* | 11/2023 | Torsteni | H01M 10/6561 |

FOREIGN PATENT DOCUMENTS

| | | |
|---|---|---|
| EP | 2375468 A2 | 10/2011 |
| JP | S37-5432 Y | 3/1962 |
| JP | 2010-129188 A | 6/2010 |
| JP | 2014-203702 A | 10/2014 |
| JP | 2016-192308 A | 11/2016 |

OTHER PUBLICATIONS

JP2014203702A reference translated (Year: 2013).*
Nov. 5, 2024 Office Action issued in Japanese Patent Application No. 2021-023169.

* cited by examiner

*Primary Examiner* — Haroon S. Sheikh
(74) *Attorney, Agent, or Firm* — Oliff PLC

(57) ABSTRACT

A battery pack disclosed herein may be provided with: a casing having a bottom surface and a front surface; and a plurality of battery cells housed inside the casing. A finger rest recess for a user to put a finger in may be defined across the bottom surface and the front surface of the casing. An anti-slip portion configured to prevent the finger of the user from slipping from rear to front may be arranged in the finger rest recess. The plurality of battery cells may include a first battery cell arranged frontmost among the plurality of the battery cells. When the battery pack is viewed from below, the finger rest recess and the first battery cell may overlap at least partially.

11 Claims, 17 Drawing Sheets

BATTERY PACK

CROSS-REFERENCE TO RELATED APPLICATION(S)

This application claims priority to Japanese Patent Application No. 2021-023169, filed on Feb. 17, 2021, the entire contents of which are incorporated herein by reference.

TECHNICAL FIELD

The art disclosed herein relates a battery pack.

BACKGROUND

European Patent Application Publication No. 2375468 discloses a battery pack. The battery pack is configured to be detachably attached to a battery pack mount of an electrical device by being slid with respect to the battery pack mount. When a front direction is defined as a direction in which the battery pack is slid when the battery pack is detached from the battery pack mount, a rear direction is defined as a direction in which the battery pack is slid when the battery pack is attached to the battery pack mount, and an up-down direction is defined as a direction orthogonal to a front-rear direction, the battery pack includes a casing having a lower surface and a front surface, and a plurality of battery cells housed inside the casing. A finger rest recess for a user to put a finger on is defined on the lower surface of the casing.

SUMMARY

There may be an electrical device where, depending on a type of the electrical device, a housing of the electrical device has a shape such that the housing covers a lower surface side of the battery pack in a state where the battery pack is attached to the battery pack mount. In this case, it might be difficult for a user to place his/her finger on the finger rest recess upon detaching the battery pack from the battery pack mount. The present teachings provide an art configured to facilitate a user to place his/her finger on a finger rest recess of a battery pack.

A battery pack disclosed herein may be configured to be detachably attached to a battery pack mount of an electrical device by being slid with respect to the battery pack mount, wherein a front direction is defined as a direction in which the battery pack is slid when the battery pack is being detached from the battery pack mount, a rear direction is defined as a direction in which the battery pack is slid when the battery pack is being attached to the battery pack mount, and an up-down direction is defined as a direction orthogonal to a front-rear direction, and the battery pack may comprise: a casing having a lower surface and a front surface; and a plurality of battery cells housed inside the casing, wherein a finger rest recess for a user to put a finger in is defined across the lower surface and the front surface of the casing, an anti-slip portion configured to prevent the finger of the user from slipping from rear to front is arranged in the finger rest recess, the plurality of the battery cells includes a first battery cell arranged frontmost among the plurality of the battery cells, and when the battery pack is viewed from below, the finger rest recess and the first battery cell overlap at least partially.

According to the above configuration, because the finger rest recess is arranged across the lower surface and the front surface of the casing, the user can easily place his/her finger in the finger rest recess even when the lower surface side of the battery pack is covered by the housing of the electrical device in a state where the battery pack is attached to the battery pack mount. Further, according to the above configuration, since the anti-slip portion is disposed in the finger rest recess, the user can easily place his/her finger on the finger rest recess and grip the battery pack. Yet further, according to the above configuration, because a space below the first battery cell is used for arranging the finger rest recess, a size of the battery pack in the front-rear direction can be smaller.

DETAILED DESCRIPTION

Figure 1:
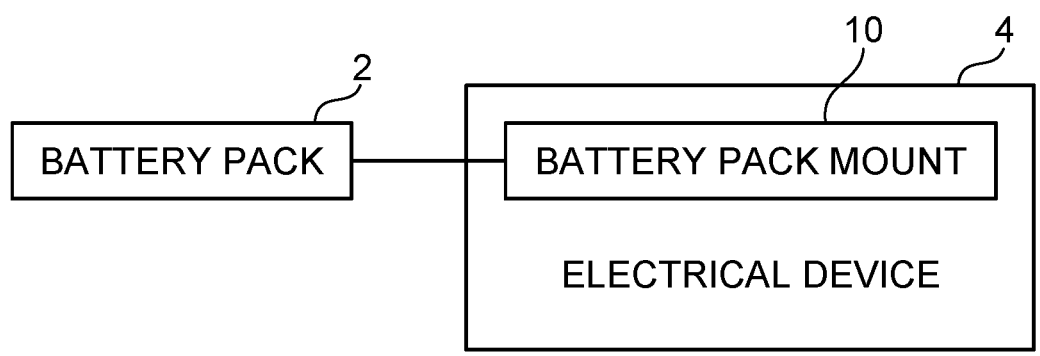
FIG. 1 schematically illustrates a battery pack 2 and an electrical device 4 according to an embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved battery packs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more aspects, a battery pack may be configured to be detachably attached to a battery pack mount of an electrical device by being slid with respect to the battery pack mount. In a case where a front direction is defined as a direction in which the battery pack is slid when the battery pack is being detached from the battery pack mount, a rear direction is defined as a direction in which the battery pack is slid when the battery pack is being attached to the battery pack mount, and an up-down direction is defined as a direction orthogonal to a front-rear direction, the battery pack may comprise: a casing having a lower surface and a front surface; and a plurality of battery cells housed inside the casing. A finger rest recess for a user to put a finger in may be defined across the lower surface and the front surface of the casing. An anti-slip portion configured to prevent the finger of the user from slipping from rear to front may be arranged in the finger rest recess. The plurality of the battery cells may include a first battery cell arranged frontmost among the plurality of the battery cells. When the battery pack is viewed from below, the finger rest recess and the first battery cell may overlap at least partially.

In one or more aspects, in the battery pack as mentioned above, the plurality of battery cells may further include a second battery cell arranged lower than the first battery cell. When the battery pack is viewed from front, the finger rest recess and the second battery cell may overlap at least partially.

According to the above configuration, since the finger rest recess is disposed by using a space that is below the first battery cell and in front of the second battery cell, a size of the battery pack in the front-rear direction and a size thereof in the up-down direction can be smaller.

In one or more aspects, the battery pack may further comprise: an engagement member that is held by the casing so as to be movable in the up-down direction and is configured to engage with the electrical device when the battery pack is attached to the battery pack mount; an operating member that has an operating surface configured to be operated by the user and is configured to move the engagement member downward when the operating surface is pushed in; and a biasing member that biases the engagement member upward. The casing may further have an upper surface. The operating surface may be exposed on the upper surface of the casing.

According to the above configuration, upon detaching the battery pack from the battery pack mount, the user can grip the battery pack while performing a pressing operation on the operating surface in a state of his/her thumb of one hand being placed in the finger rest recess, by pressing the operating surface in with his/her index finger, middle finger, ring finger, and/or pinky finger of the same hand, or alternatively in a state of his/her index finger, middle finger, ring finger, and/or pinky finger being placed in the finger rest recess, by pressing the operating surface in with his/her thumb of the same hand.

In one or more aspects, when the battery pack is viewed from below, the finger rest recess and the operating surface may overlap at least partially.

According to the above configuration, it facilitates the user to grip the battery pack when the user grips the battery pack while performing the pressing operation on the operating surface.

In one or more aspects, the finger rest recess may include: a finger rest surface extending along the front-rear direction and a right-left direction; and a convex portion that is arranged frontward than the finger rest surface and protrudes downward than the finger rest surface. The convex portion may constitute the anti-slip portion.

According to the above configuration, when the user applies and places his/her finger pad on the finger rest surface, the convex portion may prevent the finger from slipping from rear to front. Such a simple configuration can realize the anti-slip portion of the finger rest recess.

In one or more aspects, the finger rest recess may include a plurality of ribs that protrudes downward, extends in a right-left direction, and is aligned in the front-rear direction. The plurality of ribs may constitute the anti-slip portion.

According to the above configuration, when the user applies and places his/her finger pad on tips of the plural ribs, the ribs may prevent the finger from slipping from rear to front. Such a simple configuration can realize the anti-slip portion of the finger rest recess.

In one or more aspects, the finger rest recess may include an inclined finger rest surface extending along a right-left direction and inclined upward from its front side to rear side. The inclined finger rest surface may constitute the anti-slip portion.

According to the above configuration, when the user applies and places his/her finger pad on the finger rest surface, the inclined finger rest surface may prevent the finger from slipping from rear to front. Such a simple configuration can realize the anti-slip portion of the finger rest recess.

Embodiment

A battery pack 2 of a present embodiment shown in FIG. 1 is used by being attached to an electrical device 4. The electrical device 4 is an electrical device configured to operate with power supplied from the battery pack 2. The electrical device 4 may be a power tool configured to be powered by a motor, such as a driver or drill, or may be a power working machine configured to be powered by a motor, such as a trimmer, a mower or a blower. Alternatively, the electrical device 4 may be an electrical device which does not have a motor, such as a light, a radio, or a speaker. Further alternatively, the electrical device 4 may be a charger configured to charge electrical power to the battery pack 2. The battery pack 2 has a rated voltage of 36V, for example. The battery pack 2 has a maximum voltage of 40V, for example. The battery pack 2 has a rated capacity of 8.0 Ah.

The electrical device 4 comprises a battery pack mount (receptacle) 10. The battery pack 2 is attachable to the battery pack mount 10 by being slid with respect to the battery pack mount 10 in a predetermined direction. Hereafter, a direction in which the battery pack 2 is slid when the battery pack 2 is being attached to the battery pack mount 10 will be denoted "rear direction", and a direction in which the battery pack 2 is slid when the battery pack 2 is being detached from the battery pack mount 10 is denoted "front direction". Further, in the state where the battery pack 2 is attached to the battery pack mount 10, a direction in which the battery pack mount 10 is located as seen from the battery pack 2 will be denoted "up direction" and an opposite direction from the up direction will be denoted "down direction". Further, a direction orthogonal to the front-rear direction and the up-down direction wilt be denoted "left-right direction".

Figure 2:
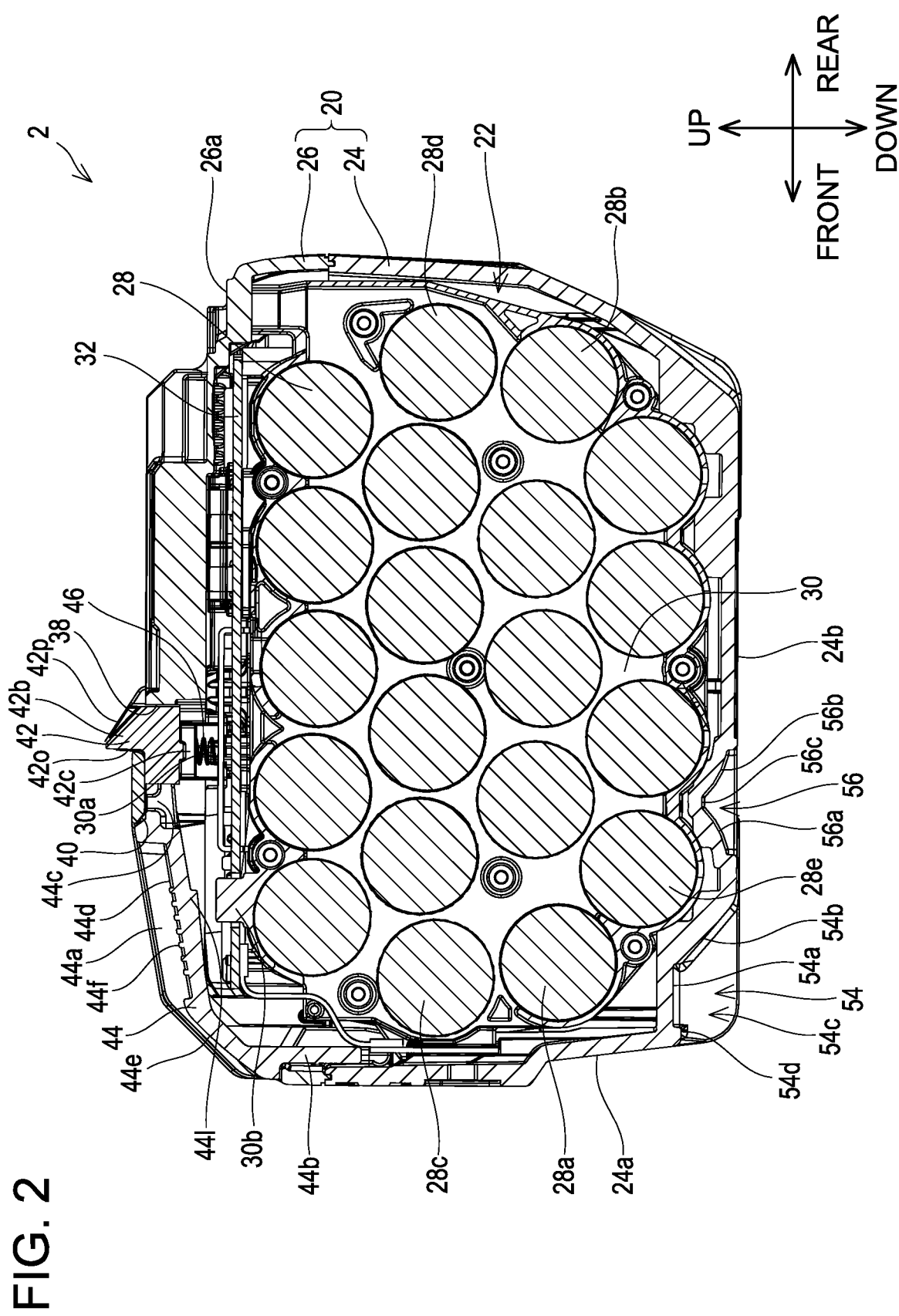
FIG. 2 is a vertical cross-sectional view of the battery pack 2 according to the embodiment.

As shown in FIG. 2, the battery pack 2 comprises a casing 20, and a battery cell unit 22 housed within the casing 20. The casing 20 comprises a lower casing 24 and an upper casing 26. A size of the battery pack 2 in the up-down direction is within a range of 60 mm to 150 mm for example, and more specifically is 110 mm for example. A size of the battery pack 2 in the front-rear direction is within a range of 80 mm to 200 mm for example, and more specifically is 152 mm for example. A size of the battery pack 2 in the left-right direction is within a range of 60 mm to 120 mm for example, and more specifically is 85 mm for example. A weight of the battery pack 2 is within a range of 1.0 kg to 2.0 kg, and more specifically is 1.9 kg for example.

The battery cell unit 22 comprises a plurality of battery cells 28, a cell holder 30 which holds the plurality of battery cells 28, and a control circuit board 32 above the cell holder 30 and held by the cell holder 30. A battery-side terminal (not shown) is disposed on an upper surface of the control circuit board 32.

The plurality of battery cells 28 is disposed in four tiers in the up-down direction. Each of the battery cells 28 is a lithium-ion battery cell, for example. Each battery cell 28 has a substantially circular cylinder shape, and its longitudinal direction extends along the left-right direction. A shape of each battery cell 28 is of type 18650 for example, of which diameter is 18 mm, and size in the longitudinal direction is 65 mm. In a first tier from below, four battery cells 28 are arranged side by side in the front-rear direction. The battery cells 28 in the first tier from below are arranged such that their positions in the up-down direction are substantially the same as each other. In a second tier from below, five battery cells 28 are arranged side by side in the front-rear direction. With regard to the front-rear direction, positions of respective centers of the battery cells 28 in the second tier from below are arranged such that they do not overlap the positions of respective centers of the battery cells 28 in the first tier from below. Of the battery cells 28 in the second tier from below, the battery cell 28a, which is the first from the front, and the battery cell 28b, which is the first from the rear, are arranged slightly lower than the other battery cells 28. In a third tier from below, six battery cells 28 are arranged side by side in the front-rear direction. With regard to the front-rear direction, positions of respective centers of the battery cells 28 in the third tier from below are arranged such that they do not overlap the positions of the respective centers of the battery cells 28 in the second tier from below. Of the battery cells 28 in the third tier from below, the battery cell 28c, which is the first from the front, and the battery cell 28d, which is the first from the rear, are slightly lower than the other battery cells 28. Of the battery cells 28 in the third tier from below, the battery cell 28c, which is the first from the front, is located frontmost among the plurality of battery cells 28. In a fourth tier from below, i.e., in a first tier from above, five battery cells 28 are arranged side by side in the front-rear direction. With respect to the front-rear direction, positions of respective centers of the battery cells 28 in the fourth tier from below are arranged such that they do not overlap the positions of the respective centers of the battery cells 28 in the third tier from below. The battery cells 28 in the fourth tier from below are arranged such that their positions in the up-down direction are substantially the same as each other.

Figure 3:
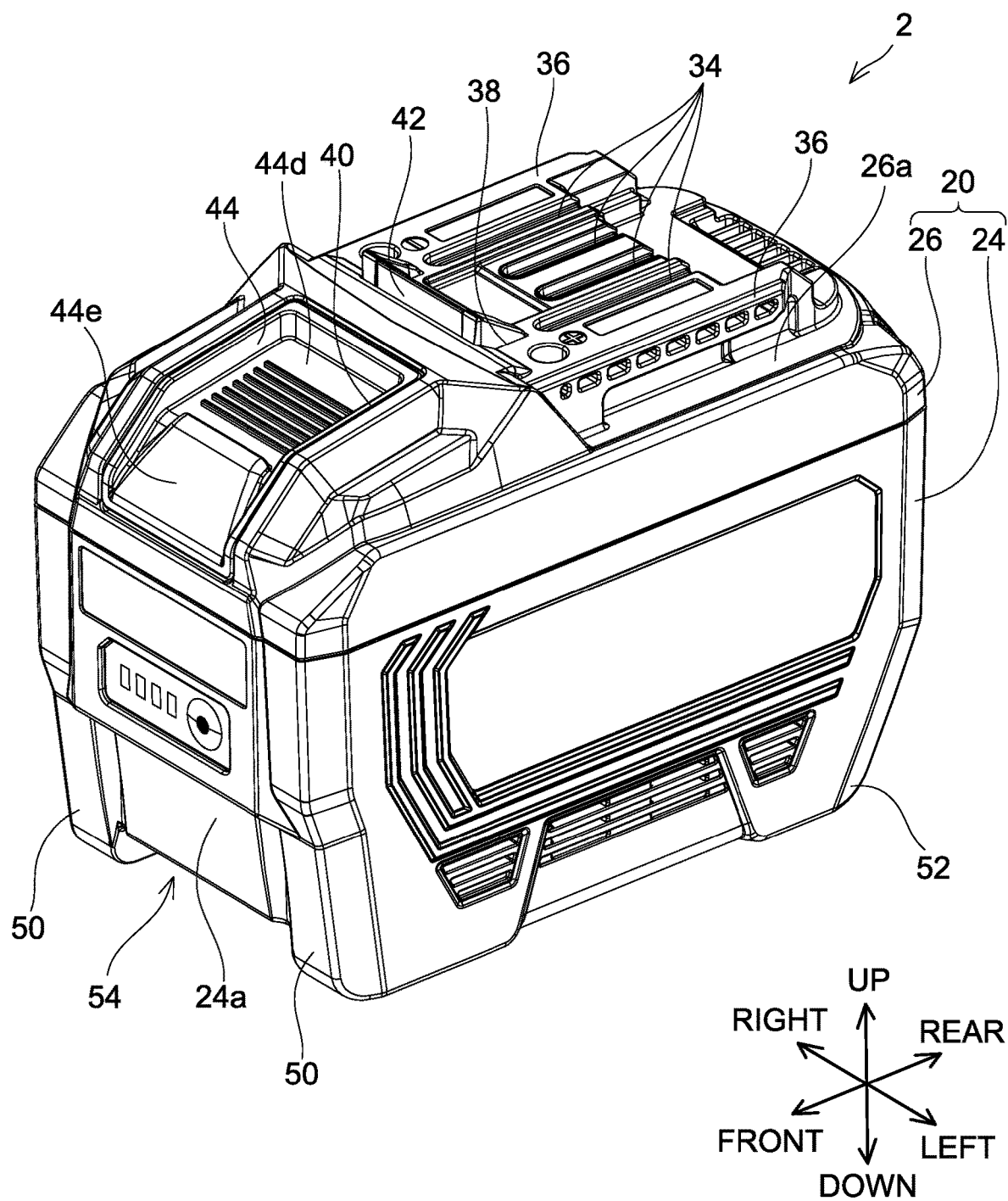
FIG. 3 is a perspective view of the battery pack 2 according to the embodiment as seen from a front, left and upper side.

As shown in FIG. 3, on an upper surface 26a of the upper casing 26, terminal openings 34, battery-side rails 36, an engagement opening 38, and an operation opening 40 are disposed. The terminal openings 34 are arranged at positions corresponding to battery-side terminals of the control circuit board 32. When the battery pack 2 is being attached to the battery pack mount 10, device-side terminals (not shown) of the battery pack mount 10 enter into the upper casing 26 through the terminal openings 34. Due to this, the device-side terminals engage with the battery-side terminals mechanically and are electrically connected to each other. The battery-side rails 36 extend along the front-rear direction at left and right sides of the terminal openings 34. When the battery pack 2 is being attached to the battery pack mount 10, the battery-side rails 36 engage with device-side rails (not shown) of the electrical device 4 slidably in the front-rear direction. The engagement opening 38 is located frontward than the terminal openings 34. An engagement member 42 is attached to the engagement opening 38. The operation opening 40 is arranged frontward than the engagement opening 38. An operating member 44 is attached to the operation opening 40.

Figure 4:
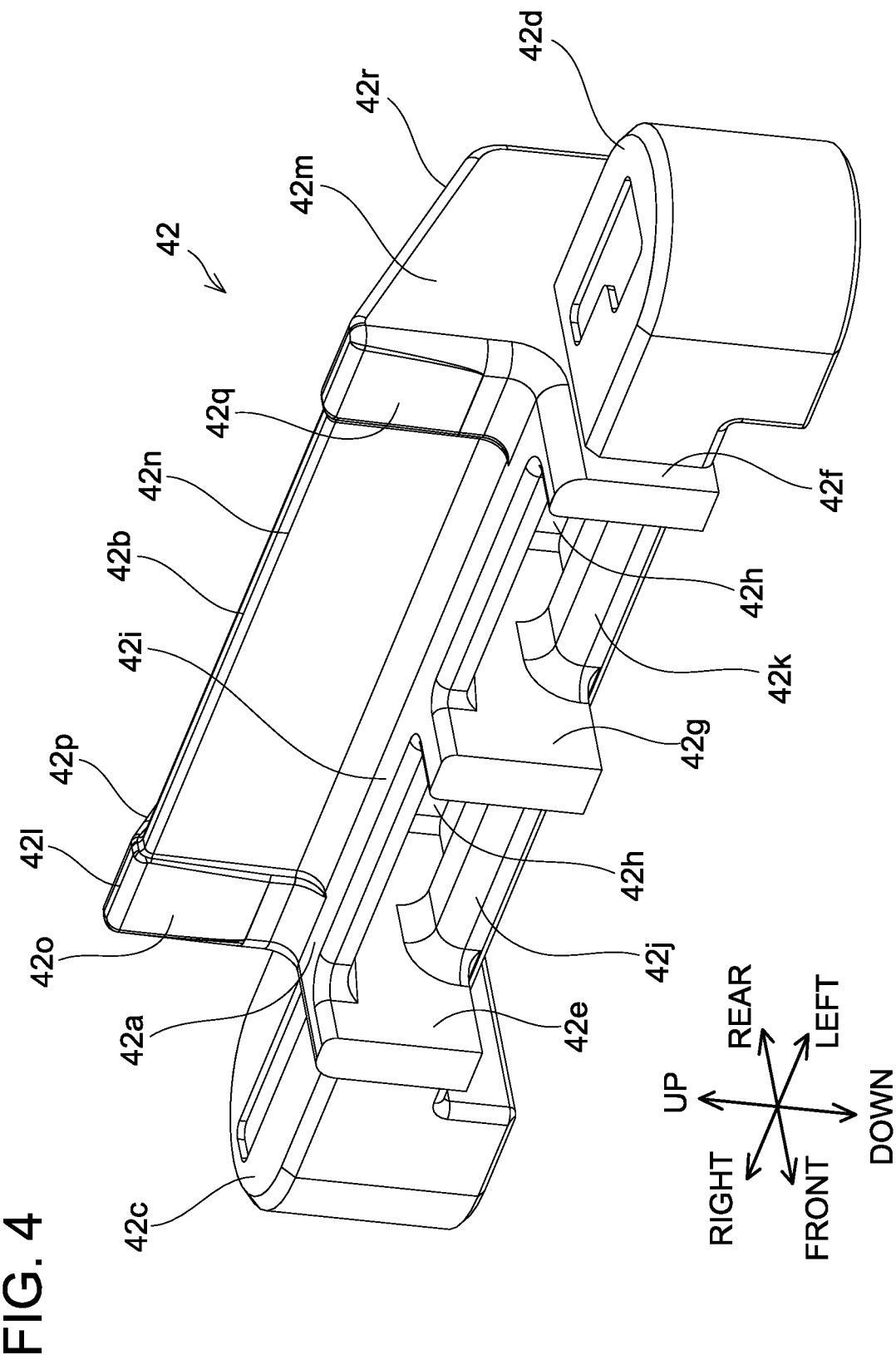
FIG. 4 is a perspective view of an engagement member 42 of the battery pack 2 according to the embodiment as seen from the front, left and upper side.

As shown in FIG. 4, the engagement member 42 comprises a base portion 42a, an engagement portion 42b protruding upward from the base portion 42a, a right support portion 42c arranged on a right side of the base portion 42a, and a left support portion 42d arranged on a left side of the base portion 42a. The base portion 42a comprises: a right wall 42e arranged along the front-rear direction and the up-down direction at a right end of the base portion 42a; a left wall 42f arranged along the front-rear direction and the up-down direction at a left end of the base portion 42a; a center wall 42g arranged along the front-rear direction and the up-down direction at a center of the base portion 42a in the left-right direction; a rear wall 42h arranged along the left-right direction and the up-down direction, the rear wall 42h connecting a rear part of the right wall 42e, a rear part of the left wall 42f, and a rear part of the center wall 42g; an upper wall 42i arranged along the front-rear direction and the left-right direction, the upper wall 42i connecting a rear upper part of the right wall 42e, a rear upper part of the left wall 42f, and a rear upper part of the center wall 42g; a right beam 42*j* extending along the left-right direction and connecting a lower part of a front-rear directional center of the right wall 42*e* and a lower part of a front-rear directional center of the center wall 42*g*; and a left beam 42*k* extending along the left-right direction and connecting a lower part of a front-rear directional center of the left wall 42*f* and the lower part of the front-rear directional center of the center wall 42*g*. The engagement portion 42*b* comprises: a right engagement portion 42*l* disposed at a right end of the engagement portion 42*b*; a left engagement portion 42*m* disposed at a left end of the engagement portion 42*b*; and a coupling portion 42*n* coupling the right engagement portion 42*l* and the left engagement portion 42*m*. The right engagement portion 42*l* comprises: a right engagement surface 42*o* arranged along the left-right direction and the up-down direction and facing frontward; and a right inclined surface 42*p* disposed rearward than the right engagement surface 42*o* and facing rear-upward and inclined downward from its front side toward its rear side. The left engagement portion 42*m* comprises: a left engagement surface 42*q* arranged along the left-right direction and the up-down direction and facing frontward; and a left inclined surface 42*r* disposed rearward than the left engagement surface 42*q* and facing rear-upward and inclined downward from its front side toward its rear side.

Figure 5:
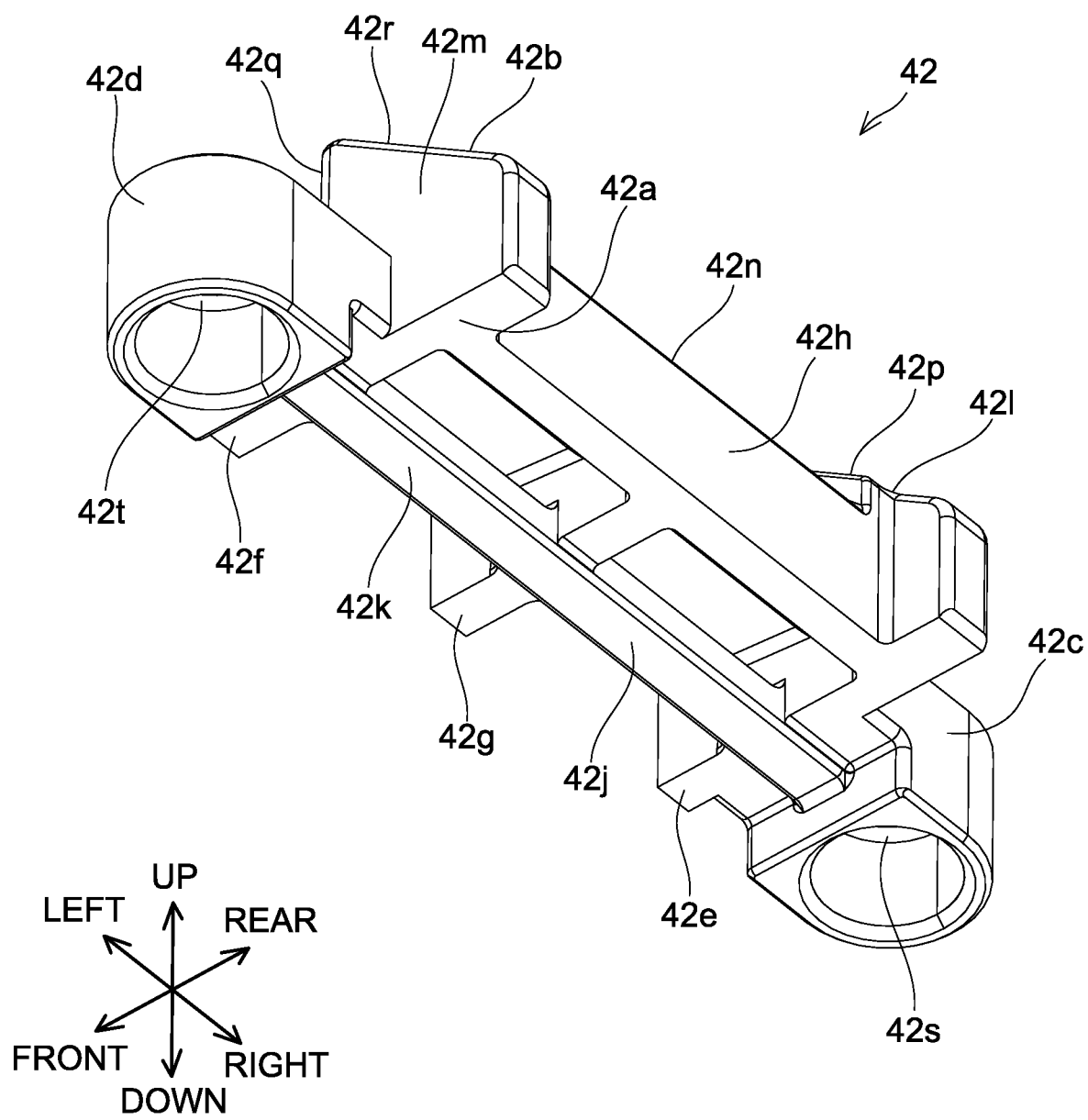
FIG. 5 is a perspective view of the engagement member 42 of the battery pack 2 according to the embodiment as seen from a rear, left, and lower side.

As shown in FIG. 5, the right support portion 42*c* comprises a spring receiving socket 42*s* having a substantially circular cylinder shape and opened downward. The left support portion 42*d* comprises a spring receiving socket 42*t* having a substantially circular cylinder shape and opened downward. A compression spring 46 (see FIG. 8) is attached to the spring receiving socket 42*s*. A compression spring 48 (see FIG. 8) is attached to the spring receiving socket 42*t*. As shown in FIG. 2, on an upper part of the cell holder 30, a spring support portion 30*a* that supports the compression spring 46 and a spring support portion (not shown) that supports the compression spring 48 are disposed. The compression springs 46 and 48 bias the engagement member 42 upward with respect to the cell holder 30. The engagement member 42 is attached to the upper casing 26 in a state where the engagement portion 42*b* protrudes external to the upper casing 26 from the engagement opening 38. The engagement member 42 is held by the upper casing 26 such that the engagement member 42 is movable in the up-down direction and immovable in the front-rear and left-right directions.

Figure 6:
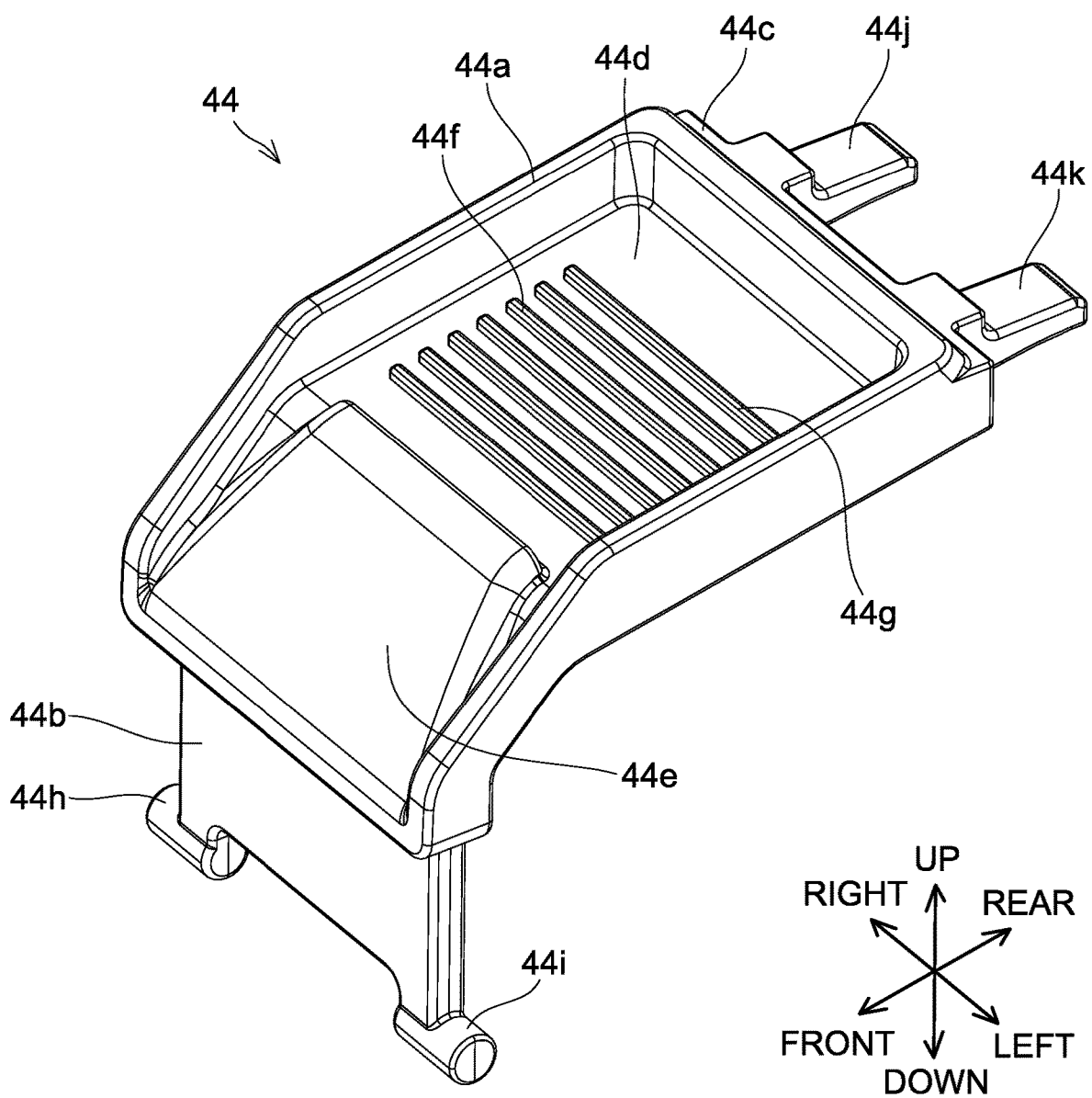
FIG. 6 is a perspective view of an operating member 44 of the battery pack 2 according to the embodiment as seen from the front, left, and upper side.
Figure 7:
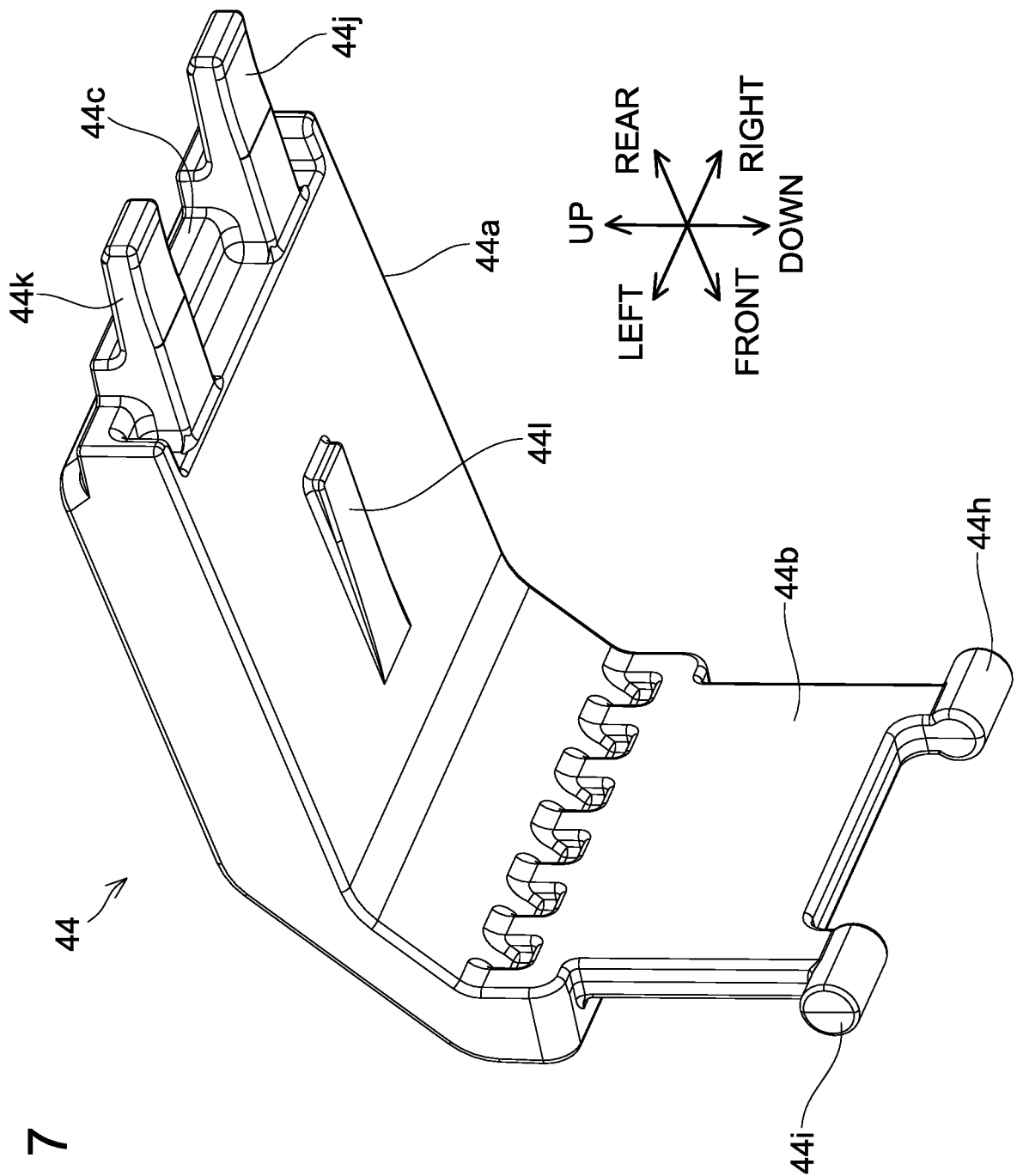
FIG. 7 is a perspective view of the operating member 44 of the battery pack 2 according to the embodiment as seen from the rear, left, and lower side.

As shown in FIG. 6, the operating member 44 comprises an operation portion 44*a*, a support portion 44*b* disposed in front of and below the operation portion 44*a*, and an abutting portion 44*c* disposed behind the operation portion 44*a*. The operation portion 44*a* comprises an upper operating surface 44*d* configured to receive a pressing operation by a user, and a lower operating surface 44*e* extending to bend front-downward from a front end of the upper operating surface 44*d* and configured to receive the pressing operation by the user. The upper operating surface 44*d* has an anti-slip portion 44*f* defined thereon. The anti-slip portion 44*f* protrudes upward from the upper operating surface 44*d* and comprises a plurality of ribs 44*g* extending in the left-right direction. The plurality of ribs 44*g* is disposed side by side at intervals of substantially 1 mm, for example, in the front-rear direction. Each rib 44*g* has a width of substantially 1 mm, for example, in the front-rear direction. The support portion 44*b* comprises a right pivotal shaft 44*h* extending rightward from a right-lower end of the support portion 44*b* and a left pivotal shaft 44*i* extending leftward from a left-lower end of the support portion 44*b*. The abutting portion 44*c* comprises a right abutting piece 44*j* extending rearward and a left abutting piece 44*k* extending rearward. The right abutting piece 44*j* and the left abutting piece 44*k* are arranged side by side in the left-right direction. As shown in FIG. 7, a stopper 44*l* protruding downward is disposed on an opposite surface from the upper operating surface 44*d* of the operation portion 44*a*.

Figure 8:
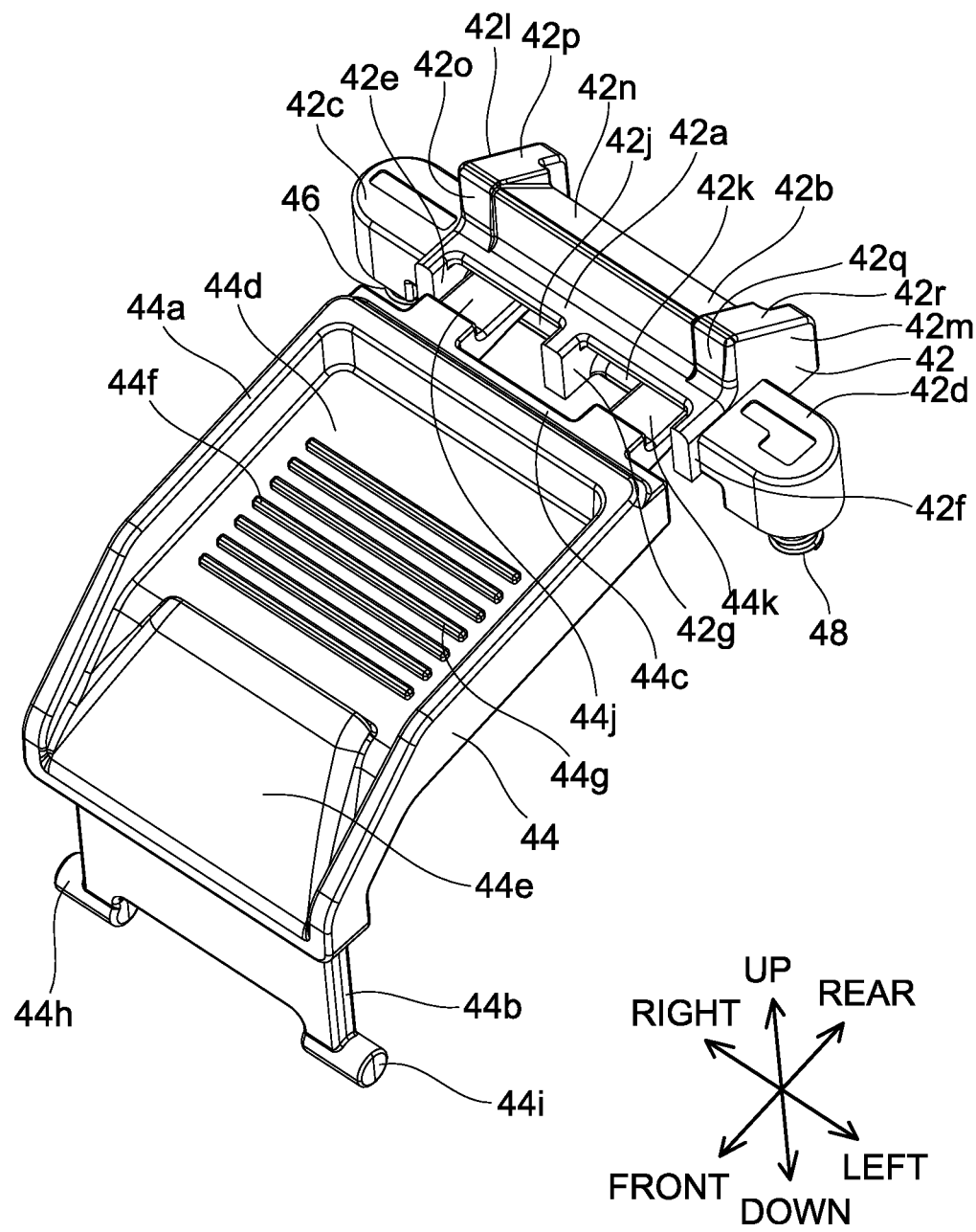
FIG. 8 is a perspective view of a positional relationship between the engagement member 42, the operating member 44, and compression springs 46, 48 of the battery pack 2 as seen from the front, left, and upper side.

As shown in FIG. 2, the operating member 44 is attached to the upper casing 26 such that the upper operating surface 44*d* and the lower operating surface 44*e* of the operation portion 44*a* are exposed outside of the upper casing 26 through the operation opening 40. At this occasion, as shown in FIG. 8, the operating member 44 is attached to the upper casing 26 in a state where the right abutting piece 44*j* and the left abutting piece 44*k* are inserted into the base portion 42*a* of the engagement member 42. The operating member 44 is held by the upper casing 26 so as to be pivotable via the right pivotal shaft 44*h* and the left pivotal shaft 44*i*.

In a state where the engagement member 42 and the operating member 44 are attached to the upper casing 26, the right abutting piece 44*j* of the operating member 44 is located above the right beam 42*j* of the engagement member 42 and the left abutting piece 44*k* of the operating member 44 is located above the left beam 42*k* of the engagement member 42. Due to this, by the compression springs 46 and 48 biasing the engagement member 42 upward with respect to the cell holder 30, the engagement member 42 is pressed against the upper casing 26 and also the right abutting piece 44*j* and the left abutting piece 44*k* of the operating member 44 are pushed upward by the right beam 42*j* and the left beam 42*k* of the engagement member 42, as a result of which the operating member 44 is also pressed against the upper casing 26.

When the battery pack 2 is being attached to the battery pack mount 10 of the electrical device 4, a housing 12 (see FIGS. 11 to 13) of the electrical device 4 moves from rear to front while abutting the right inclined surface 42*p* and the left inclined surface 42*r* of the engagement member 42, by which the engagement member 42 is pressed downward in spite of the biasing force of the compression springs 46 and 48. Thereafter, when an engagement recess 14 (see FIGS. 11 to 13) of the housing 12 of the electrical device 4 has moved above the engagement portion 42*b* of the engagement member 42, the engagement member 42 is pressed upward by the biasing force of the compression springs 46 and 48, by which the engagement portion 42*b* enters into the engagement recess 14. Because in this state the right engagement surface 42*o* and the left engagement surface 42*q* of the engagement member 42 are located facing an engagement surface 14*a* of the engagement recess 14 (see FIGS. 11 to 13), the battery pack 2 is inhibited from being slid frontward with respect to the battery pack mount 10. Due to this, the battery pack 2 is inhibited from being detached from the battery pack mount 10.

When the battery pack 2 is being detached from the battery pack mount 10, the user conducts the pressing operation on the upper operating surface 44*d* and/or the lower operating surface 44*e* of the operating member 44. With this operation, the operating member 44 pivots around the right pivotal shaft 44*h* and the left pivotal shaft 44*i*. At this occasion, the operating member 44 is configured to be pivotable until the stopper 44*l* (see FIG. 2) abuts a stopper 30*b* (see FIG. 2) disposed on the cell holder 30. Accompanying the pivoting of the operating member 44, the right beam 42*j* and the left beam 42*k* of the engagement member 42 are pressed below downward by the right abutting piece 44*j* and the left abutting piece 44*k* of the operating member 44, by which the engagement member 42 is pressed below downward in spite of the biasing force of the compression springs 46 and 48. Due to this, the engagement portion 42b of the engagement member 42 exits from the engagement recess 14 (see FIGS. 11 to 13) of the housing 12 of the electrical device 4, as a result of which the battery pack 2 is allowed to be slid frontward with respect to the battery pack mount 10. By the user sliding the battery pack 2 frontward with respect to the battery pack mount 10 from this state, the battery pack 2 can be detached from the battery pack mount 10.

Figure 9:
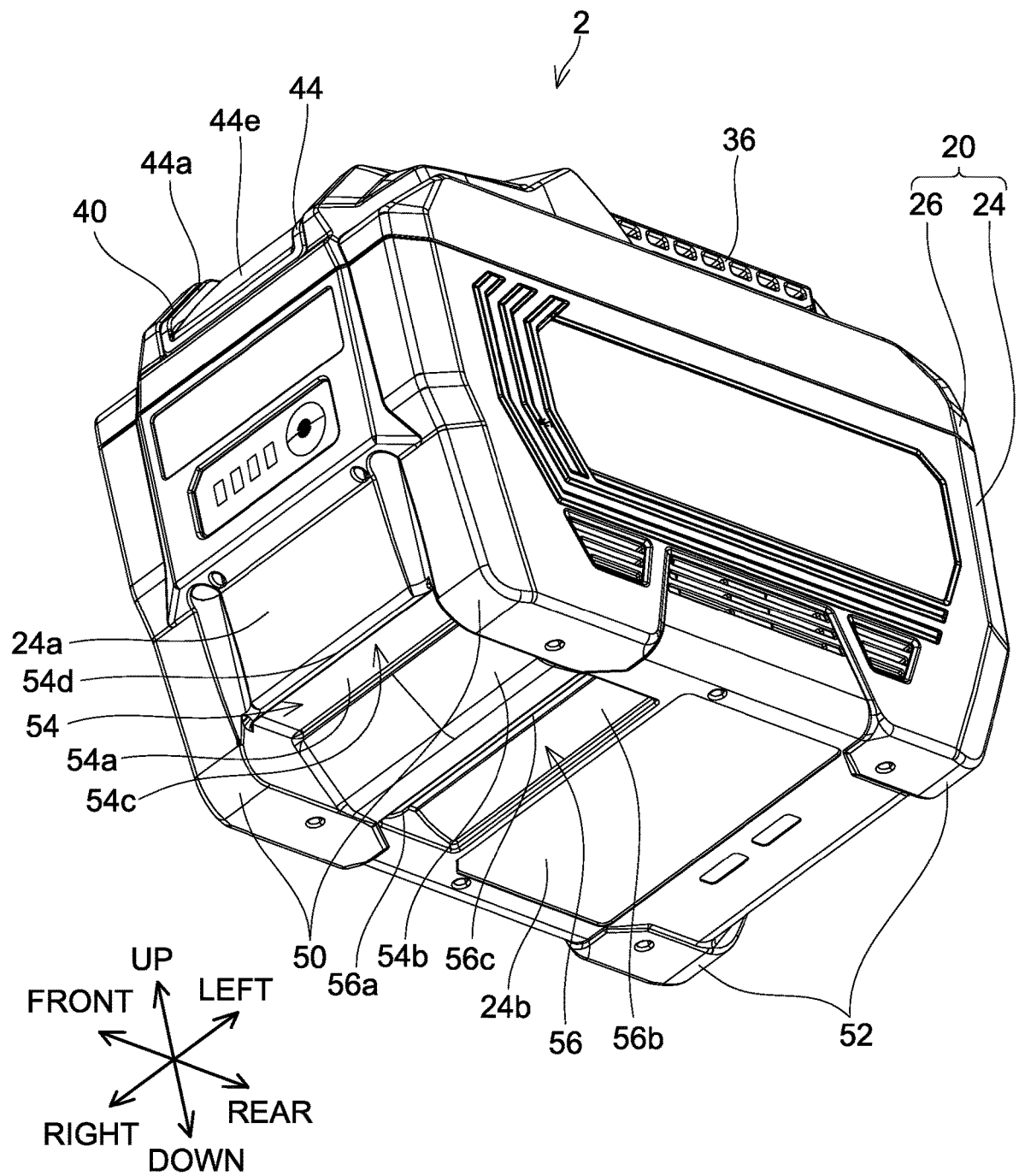
FIG. 9 is a perspective view of the battery pack 2 according to the embodiment as seen from a front, left and lower side.

As shown in FIG. 9, the lower casing 24 has a front-lower right end and a front-lower left end which comprise front guard portions 50 protruding frontward and downward. Further, the lower casing 24 has a rear-lower right end and a rear-lower left end which comprise rear guard portions 52 protruding rearward and downward. In case the battery pack 2 falls down unexpectedly, the front guard portions 50 and/or the rear guard portions 52 bump against a ground or floor surface.

The lower casing 24 comprises a first finger rest recess 54 and a second finger rest recess 56 defined thereon. The first finger rest recess 54 is disposed more on an inner side than the front guard portions 50 and disposed across a front surface 24a of the lower casing 24 and a lower surface 24b of the lower casing 24. The second finger rest recess 56 is disposed rearward than the first finger rest recess 54 on the lower surface 24b of the lower casing 24. A width of the first finger rest recess 54 in the left-right direction and a width of the second finger rest recess 56 in the left-right direction are substantially same as each other.

Figure 10:
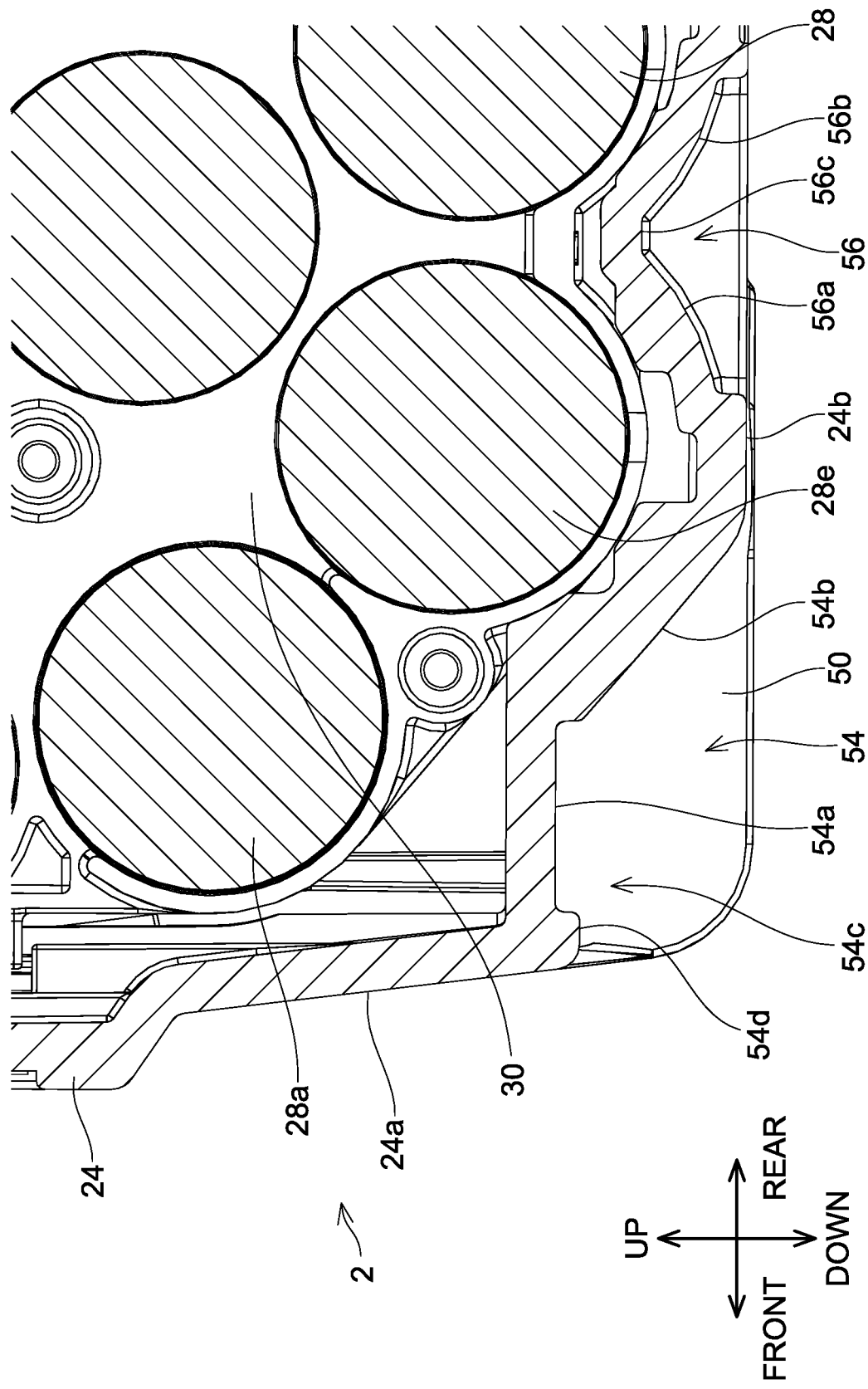
FIG. 10 is a vertical cross-sectional view of a vicinity of a first finger rest recess 54 and a second finger rest recess 56 of the battery pack 2 according to the embodiment.

As shown in FIG. 10, the first finger rest recess 54 comprises a finger rest surface 54a disposed along the front-rear direction and the left-right direction and facing downward and an inclined surface 54b disposed rearward than the finger rest surface 54a and facing front-downward and being inclined downward from its front side toward its rear side. In the up-down direction, the finger rest surface 54a is located higher than a lower end of battery cell 28e, which is first from front among the battery cells 28 in the first tier from below. In the front-rear direction, a rear end of the finger rest surface 54a is located rearward than a front end of the battery cell 28a, which is the first from front among the battery cells 28 in the second tier from below. That is, the first finger rest recess 54 is arranged in a space that is in front of the battery cell 28 being the first from front among the battery cells 28 in the first tier from below, and also is below the battery cell 28 being the first from front among the battery cells 28 in the second tier from below. The finger rest surface 54a comprises an anti-slip portion 54c defined thereon. The anti-slip portion 54c comprises a convex portion 54d protruding downward from the finger rest surface 54a and extending at a front end of the finger rest surface 54a in the left-right direction.

The second finger rest recess 56 comprises a first convex surface 56a slightly protruding rear-downward, a second convex surface 56b disposed rearward than the first convex surface 56a and slightly protruding front-downward, and a connecting surface 56c connecting an upper end of the first convex surface 56a and an upper end of the second convex surface 56b. The first convex surface 56a is inclined, as a whole, upward from its front side toward its rear side. The second convex surface 56b is inclined, as a whole, downward from its front side toward its rear side.

Figure 11:
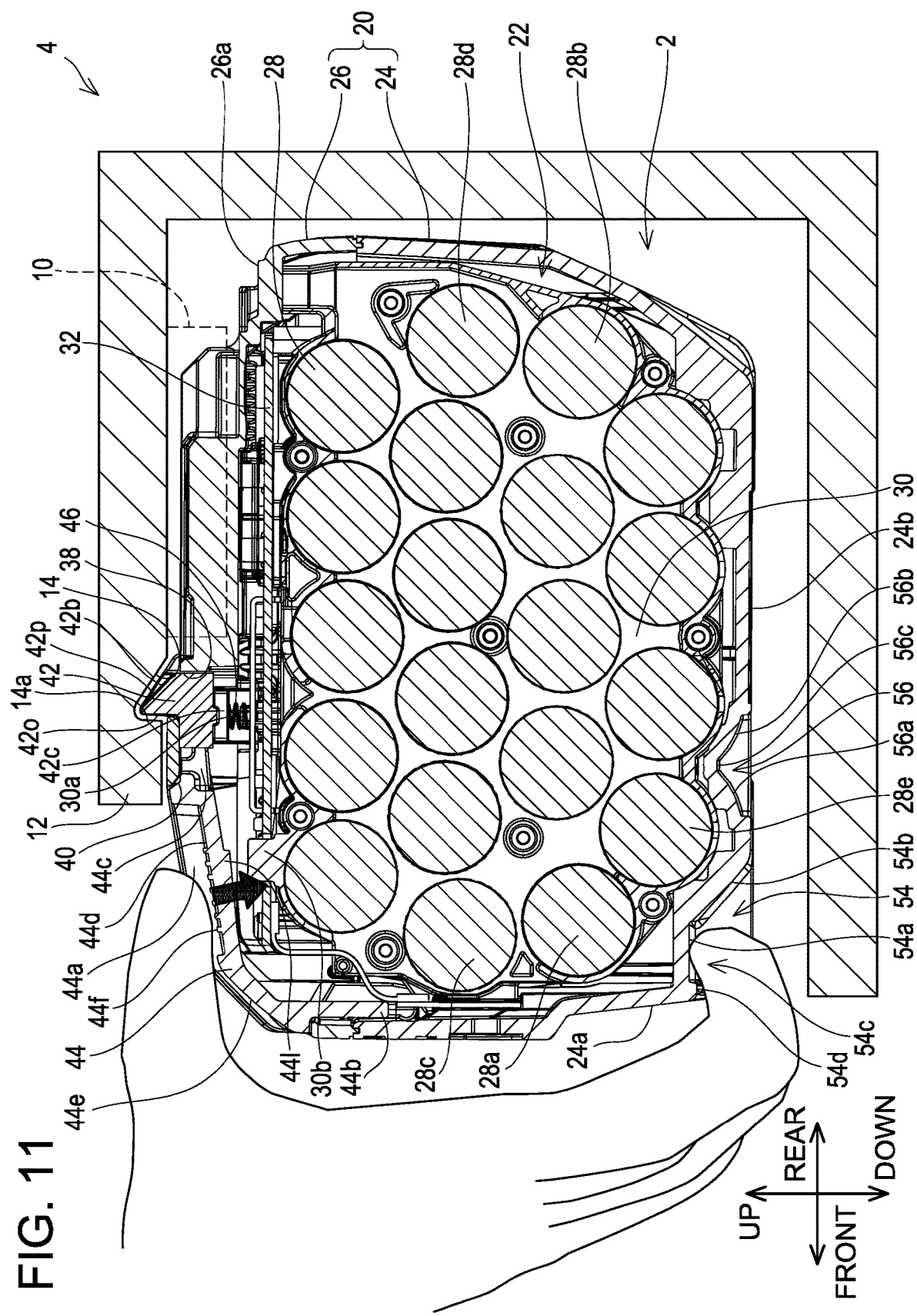
FIG. 11 is a vertical cross-sectional view which shows an example of how a user grips the battery pack 2 in a state where the battery pack 2 according to the embodiment is attached to the electrical device 4.
Figure 12:
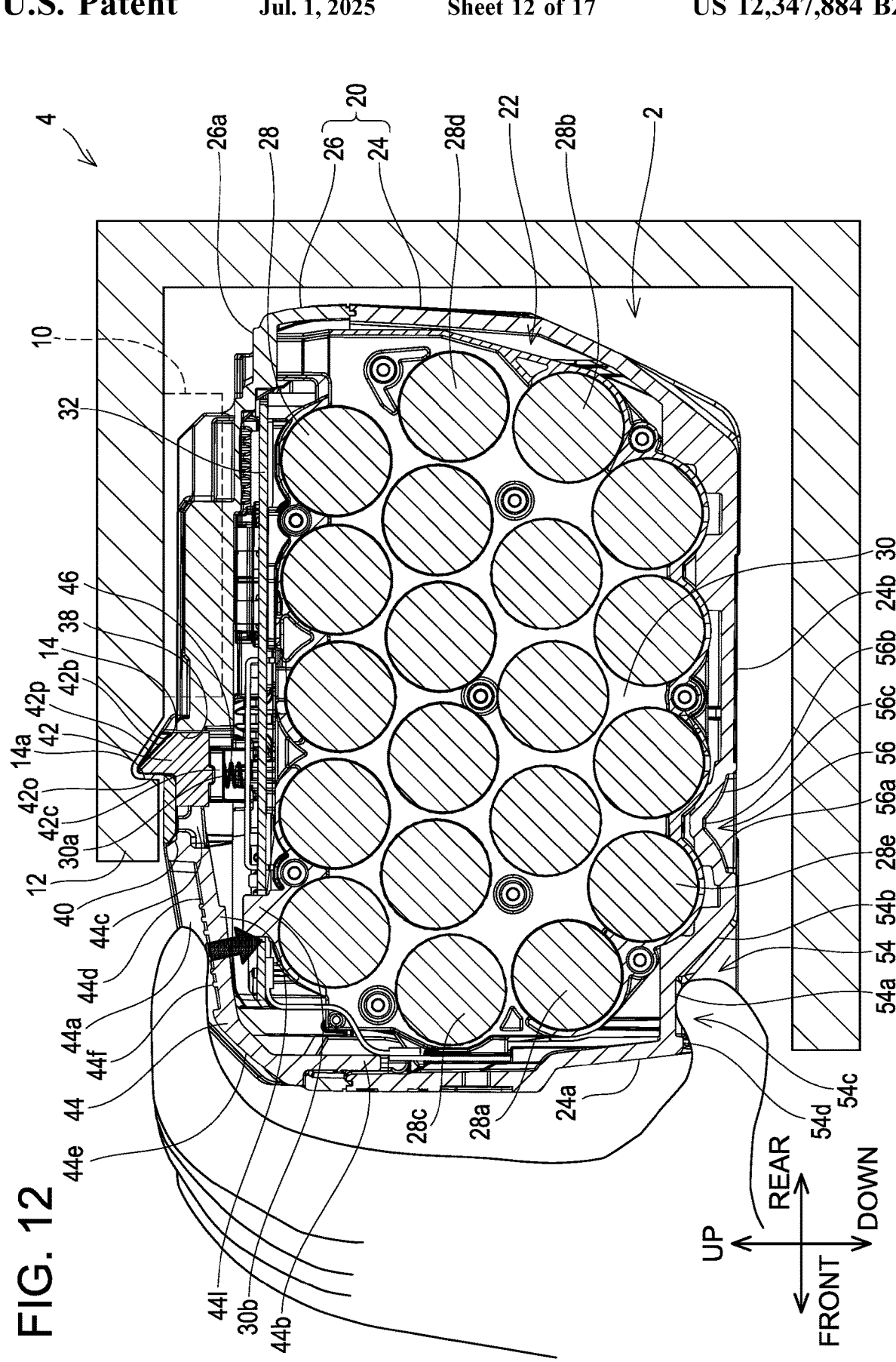
FIG. 12 is a vertical cross-sectional view which shows another example of how the user grips the battery pack 2 in a state where the battery pack 2 according to the embodiment is attached to the electrical device 4.
Figure 13:
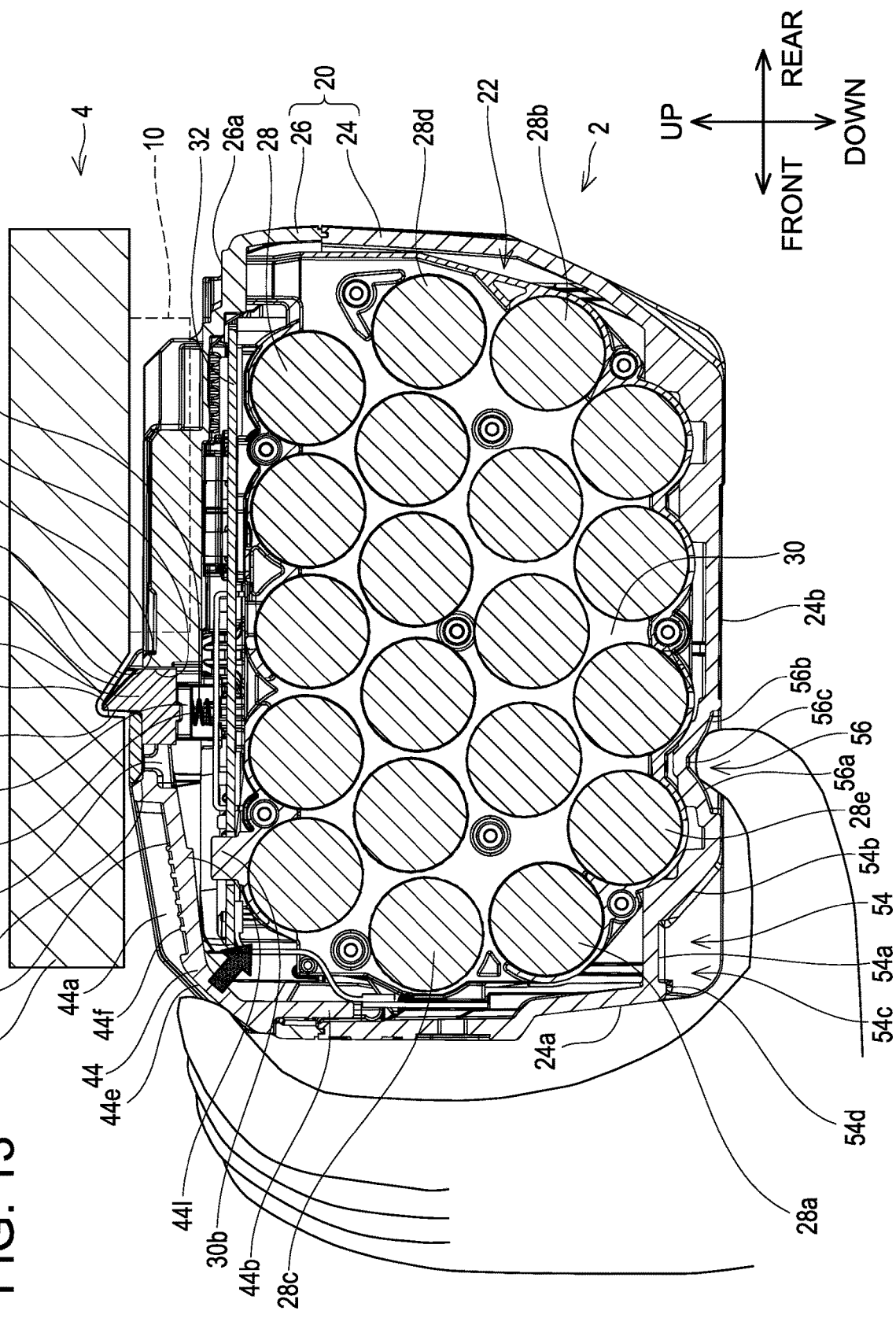
FIG. 13 is a vertical cross-sectional view which shows yet another example of how a user grips the battery pack 2 in a state where the battery pack 2 according to the embodiment is attached to the electrical device 4.

As shown in FIGS. 11 to 13, a shape of the housing 12 in vicinity of the battery pack mount 10 in the electrical device 4 varies according to types of the electrical device 4. For example, as shown in FIG. 11, there may be a case where the housing 12 of the electrical device 4 exists not only on an upper surface 26a side of the battery pack 2 but also on a lower surface 24b side of the battery pack 2 when the battery pack 2 is attached to the battery pack mount 10. In such a case, if an interval between the housing 12 and the lower surface 24b of the battery pack 2 is small, a finger of the user might not be able to enter therein, which makes it difficult for the user to grip the battery pack 2. In the battery pack 2 of the present embodiment however, since the first finger rest recess 54 across the front surface 24a and the lower surface 24b of the battery pack 2 is provided, the user is able to grip the battery pack 2 by placing his/her index finger, middle finger, ring finger, and/or pinky finger on the first finger rest recess 54 and placing his/her thumb on the upper operating surface 44d of the operating member 44 of the same hand. From this state, the user is able to perform the pressing operation on the upper operating surface 44d with his/her thumb, and is able to detach the battery pack 2 from the battery pack mount 10. Alternatively, as shown in FIG. 12, the user is also able to grip the battery pack 2 by placing his/her thumb on the first finger rest recess 54 and placing his/her index finger, middle finger, ring finger, and/or pinky finger of the same hand on the upper operating surface 44d of the operating member 44. From this state, the user is able to perform the pressing operation on the upper operating surface 44d with his/her index finger, middle finger, ring finger, and/or pinky finger, and is able to detach the battery pack 2 from the battery pack mount 10.

Alternatively, as shown in FIG. 13, there may be a case where the housing 12 of the electrical device 4 is present above the upper operating surface 44d of the operating member 44 when the battery pack 2 is attached to the battery pack mount 10. In such a case, if an interval between the upper operating surface 44d and the housing 12 is small, a finger of the user is not able to enter therein, which makes it difficult for the user to grip the battery pack 2. In the battery pack 2 according to the present embodiment however, since the operating member 44 comprises the lower operating surface 44e, the user is able to grip the battery pack 2 by placing his/her thumb on the second finger rest recess 56 and placing his/her index finger, middle finger, ring finger, and/or pinky finger of the same hand on the lower operating surface 44e. From this state, the user is able to perform the pressing operation on the lower operating surface 44e with his/her index finger, middle finger, ring finger, and/or pinky finger, and is able to detach the battery pack 2 from the battery pack mount 10. In the battery pack 2 according to the present embodiment, because the operating member 44 is pivotably supported by the casing 20, even with the pressing operation on the upper operating surface 44d as shown in FIGS. 11 and 12 (in this case, force acting downward is applied to the operating member 44), or even with the pressing operation on the lower operating surface 44e as shown in FIG. 13 (in this case, force acting rear-downward is applied to the operating member 44), the user is able to perform the pressing operation on the operating member 44 without exerting great force.

(Variants)

Figure 14:
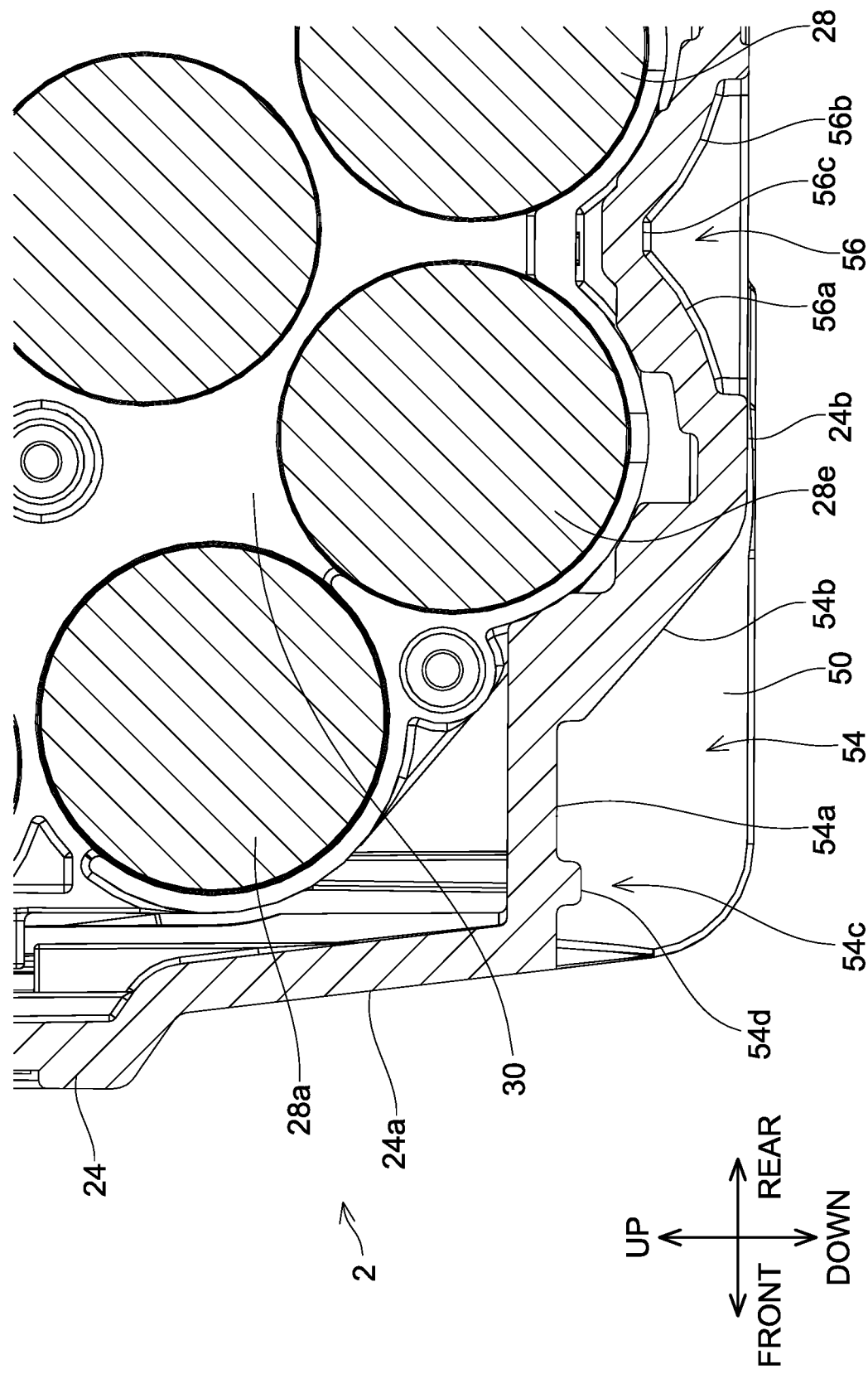
FIG. 14 is a vertical cross-sectional view of a vicinity of a first finger rest recess 54 and a second finger rest recess 56 of a battery pack 2 according to a variant.

The first finger rest recess 54 may take various shapes. For example, as shown in FIG. 14, the convex portion 54d may be arranged at a position offset rearward from the front end of the finger rest surface 54a. In an example shown in FIG. 14, a size of the finger rest surface 54a in the front-rear direction that is on the rear side than the convex portion 54d is secured to allow a finger of the user to be placed thereon (e.g., substantially 10 mm).

Figure 15:
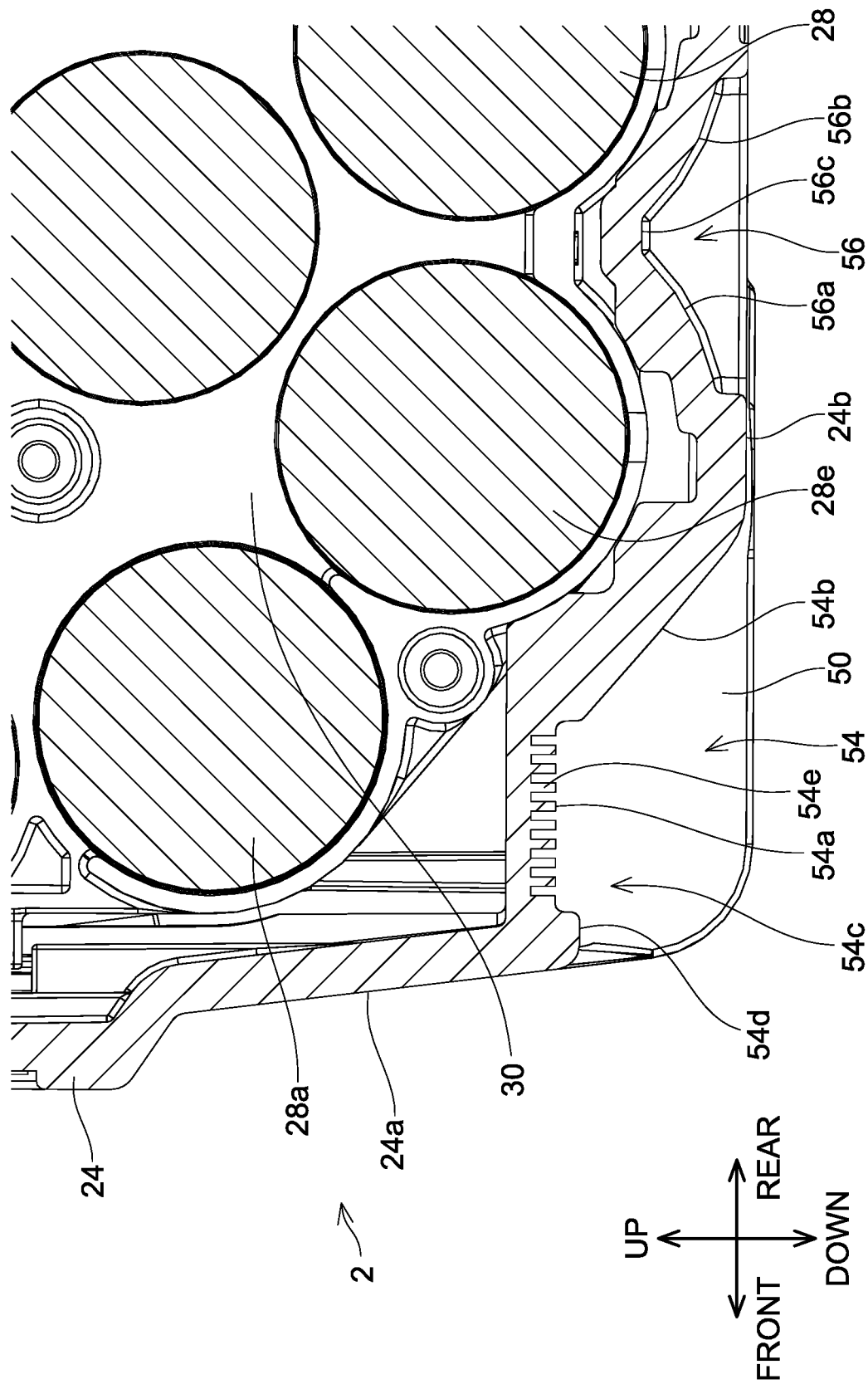
FIG. 15 is a vertical cross-sectional view of a vicinity of a first finger rest recess 54 and a second finger rest recess 56 of a battery pack 2 according to another variant.

Alternatively, as shown in FIG. 15, the finger rest surface 54a may not be continuously flat, but may be a discontinuously flat surface composed of lower surfaces of a plurality of ribs 54e formed for weight reduction.

Figure 16:
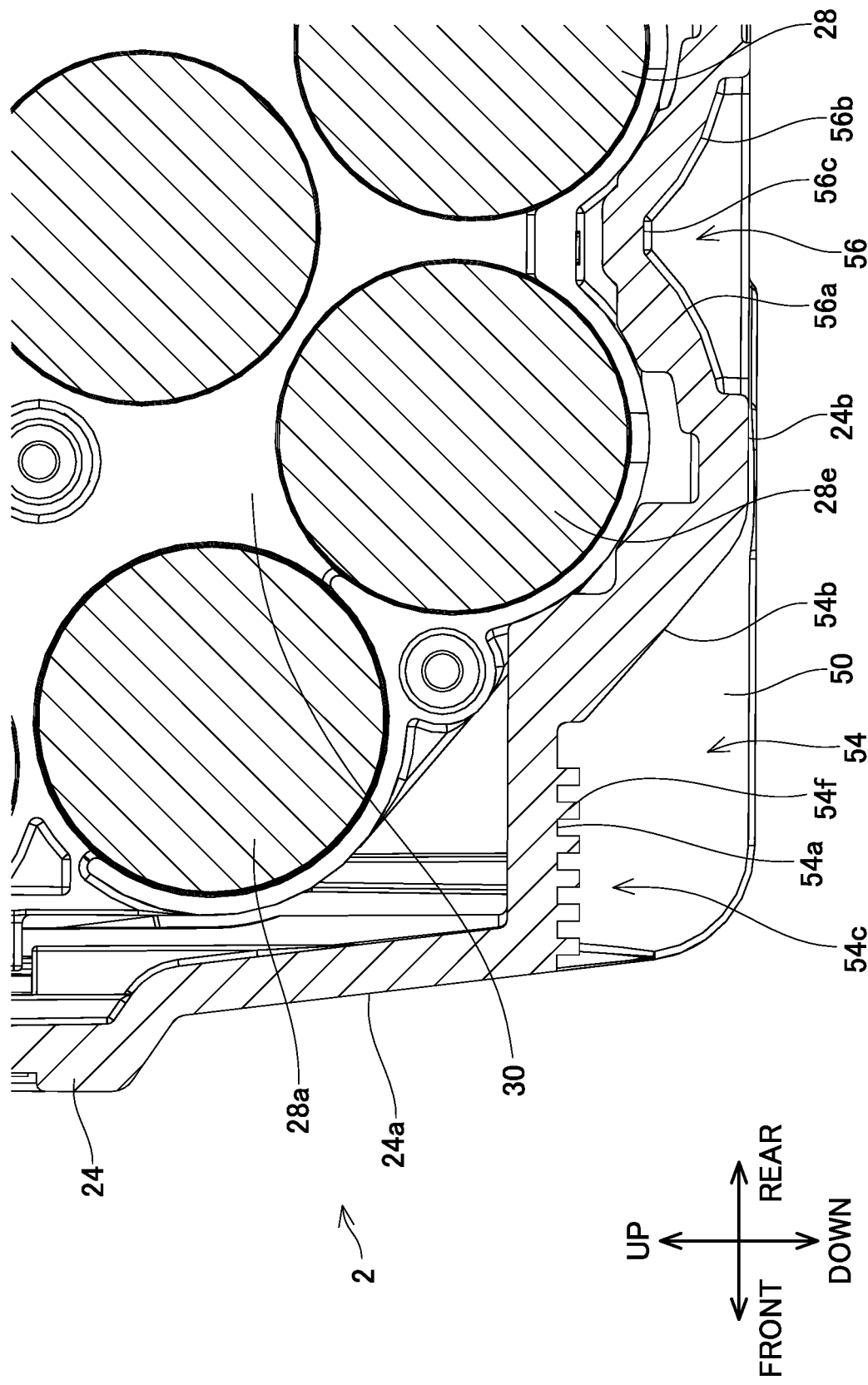
FIG. 16 is a vertical cross-sectional view of a vicinity of a first finger rest recess 54 and a second finger rest recess 56 of a battery pack 2 according to yet another variant.

Further alternatively, a configuration other than the convex portion 54d may constitute the anti-slip portion 54c. For example, as shown in FIG. 16, the anti-slip portion 54c may comprise a plurality of ribs 54f protruding downward from the finger rest surface 54a and extending in the left-right direction. The plurality of ribs 54f is arranged side by side at intervals of substantially 1 mm for example in the front-rear direction, and each rib 54f has a width of substantially 1 mm for example in the front-rear direction.

Figure 17:
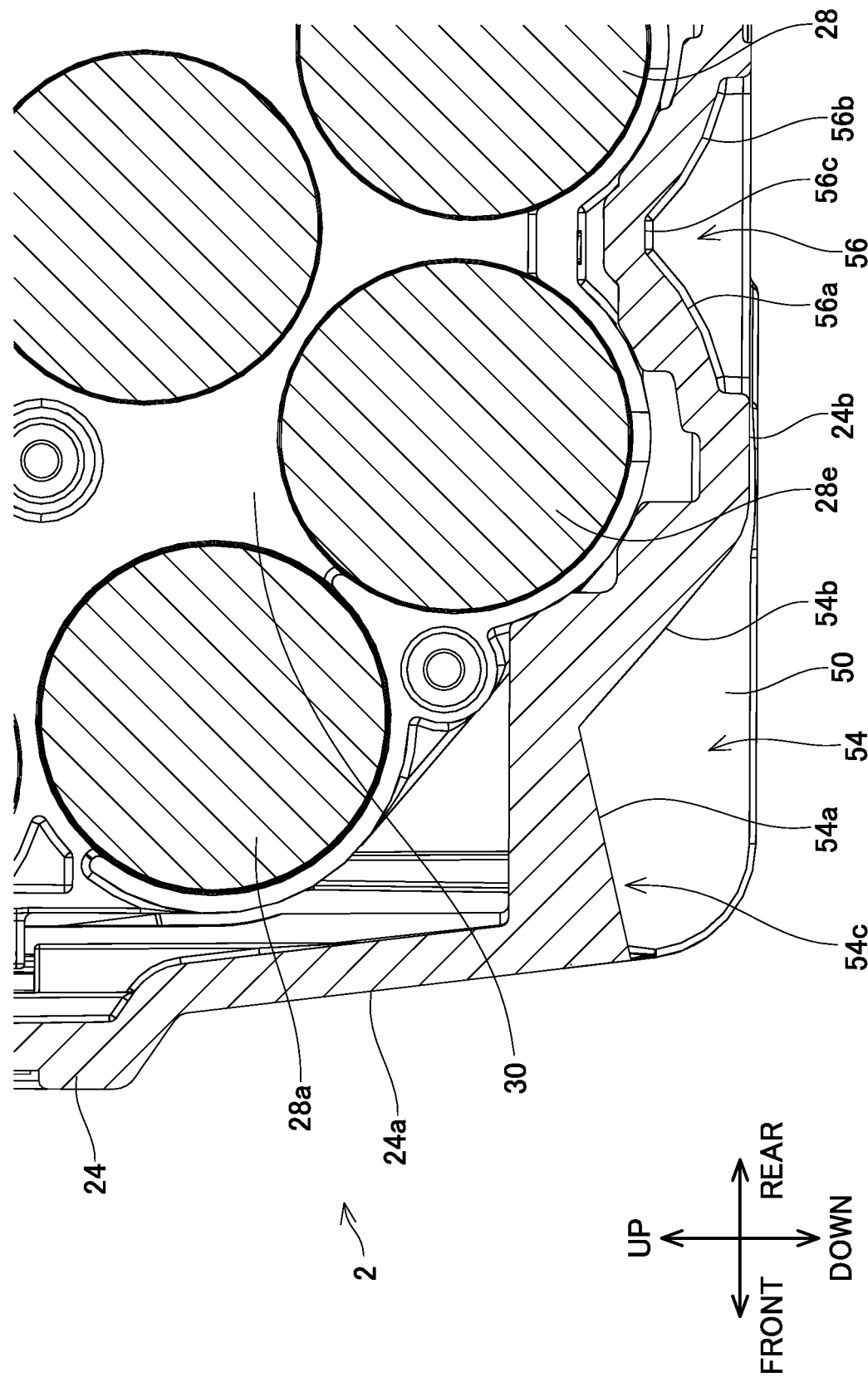
FIG. 17 is a vertical cross-sectional view of a vicinity of a first finger rest recess 54 and a second finger rest recess 56 of a battery pack 2 according to yet another variant.

Alternatively, as shown in FIG. 17, by shaping the finger rest surface 54a to be inclined upward from its front side toward its rear side, the inclined finger rest surface 54a itself may serve as the anti-slip portion 54c.

Although in the above embodiment, the configuration in which the operating member 44 is pivotably supported by the casing 20 was described, the operating member 44 may be configured to be supported by the casing 20 movably in the up-down direction. In this case, the engagement member 42 and the operating member 44 may be integrated together as a single member.

Although in the above embodiment the configuration in which the battery cells 28 are lithium ion battery cells was described, the battery cells 28 may be another type of secondary battery cells. Further, although in the above embodiment the configuration in which each battery cell 28 has a substantially circular cylinder shape was described, the battery cells 28 may have another shape. Number of the battery cells 28 comprised by the battery pack 2 may be different from the number of the battery cells 28 in the above embodiment. Layout of the battery cells 28 inside the battery pack 2 may be different from the layout in the above embodiment.

As mentioned above, the battery pack 2 is configured to be detachably attached to the battery pack mount 10 of the electrical device 4 by being slid with respect to the battery pack mount 10. In a case where a front direction is defined as a direction in which the battery pack 2 is slid when the battery pack 2 is being detached from the battery pack mount 10, a rear direction is defined as a direction in which the battery pack 2 is slid when the battery pack 2 is being attached to the battery pack mount 10, and an up-down direction is defined as a direction orthogonal to a front-rear direction, the battery pack 2 comprises: the casing 20 having the lower surface 24b and the front surface 24a; and the plurality of battery cells 28 housed inside the casing 20. The first finger rest recess 54 (example of a finger rest recess) for a user to put a finger in is defined across the lower surface 24b and the front surface 24a of the casing 20. The anti-slip portion 54c configured to prevent the finger of the user from slipping from rear to front is arranged in the first finger rest recess 54. The plurality of battery cells 28 includes the battery cell 28c (example of a first battery cell) arranged frontmost among the plurality of the battery cells 28. As shown in FIG. 2, when the battery pack 2 is viewed from below, the first finger rest recess 54 and the battery cell 28c overlap at least partially.

According to the above configuration, because the first finger rest recess 54 is arranged across the lower surface 24b and the front surface 24a of the casing 20, the user can easily place his/her finger in the first finger rest recess 54 even when the lower surface 24b side of the battery pack 2 is covered by the housing 12 of the electrical device 4 in a state where the battery pack 2 is attached to the battery pack mount 10. Further, according to the above configuration, since the anti-slip portion 54c is disposed in the first finger rest recess 54, the user can easily place his/her finger on the first finger rest recess 54 and grip the battery pack 2. Yet further, according to the above configuration, because a space below the battery cell 28c is used for arranging the first finger rest recess 54, a size of the battery pack 2 in the front-rear direction can be smaller.

In one or more aspects, in the battery pack 2, the plurality of battery cells 28 further includes the battery cell 28e (example of a second battery cell) arranged lower than the battery cell 28c. As shown in FIG. 2, when the battery pack 2 is viewed from front, the first finger rest recess 54 and the battery cell 28e overlap at least partially.

According to the above configuration, since the first finger rest recess 54 is disposed by using a space that is below the battery cell 28c and in front of the battery cell 28e, a size of the battery pack 2 in the front-rear direction and a size thereof in the up-down direction can be smaller.

In one or more aspects, the battery pack 2 further comprises: the engagement member 42 that is held by the casing 20 so as to be movable in the up-down direction and configured to engage with the electrical device 4 when the battery pack 2 is attached to the battery pack mount 10; the operating member 44 that has the upper operating surface 44d and the lower operating surface 44e (examples of an operating surface) that are configured to be operated by the user and are configured to move the engagement member 42 downward when the upper operating surface 44d and/or the lower operating surface 44e are pushed in; and the compression springs 46, 48 (examples of a biasing member) that bias the engagement member 42 upward. The casing 20 further has the upper surface 26a. The upper operating surface 44d and the lower operating surface 44e are exposed on the upper surface 26a of the casing 20.

According to the above configuration, upon detaching the battery pack 2 from the battery pack mount 10, the user can grip the battery pack 2 while performing a pressing operation on the upper operating surface 44d and/or the lower operating surface 44e in a state of his/her thumb of one hand being placed in the first finger rest recess 54, by pressing the upper operating surface 44d and/or the lower operating surface 44e in with his/her index finger, middle finger, ring finger, and/or pinky finger of the same hand, or alternatively in a state of his/her index finger, middle finger, ring finger, and/or pinky finger being placed in the first finger rest recess 54, by pressing the upper operating surface 44d and/or the lower operating surface 44e in with his/her thumb of the same hand.

In one or more aspects, when the battery pack 2 is viewed from below, the first finger rest recess 54 and the upper operating surface 44d, the lower operating surface 44e overlap at least partially.

According to the above configuration, it facilitates the user to grip the battery pack 2 when the user grips the battery pack 2 while performing the pressing operation on the upper operating surface 44d and/or the lower operating surface 44e.

In one or more aspects, the first finger rest recess 54 includes: the finger rest surface 54a extending along the front-rear direction and the right-left direction; and the convex portion 54d that is arranged frontward than the finger rest surface 54a and protrudes downward than the finger rest surface 54a. In this case, the convex portion 54d constitutes the anti-slip portion 54c.

According to the above configuration, when the user applies and places his/her finger pad on the finger rest surface 54a, the convex portion 54d may prevent the finger from slipping from rear to front. Such a simple configuration can realize the anti-slip portion 54c of the first finger rest recess 54.

In one or more aspects, the first finger rest recess 54 includes the plurality of ribs 54f that protrudes downward, extends in the right-left direction, and is aligned in the front-rear direction. In this case, the plurality of ribs 54f constitutes the anti-slip portion 54c.

According to the above configuration, when the user applies and places his/her finger pad on tips of the plurality of ribs 54f, the ribs 54f may prevent the finger from slipping from rear to front. Such a simple configuration can realize the anti-slip portion 54c of the first finger rest recess 54.

In one or more aspects, the first finger rest recess 54 includes the inclined finger rest surface 54a extending along the right-left direction and inclined upward from its front side to rear side. In this case, the inclined finger rest surface 54a constitutes the anti-slip portion 54c.

According to the above configuration, when the user applies and places his/her finger pad on the finger rest surface 54a, the inclined finger rest surface 54a may prevent the finger from slipping from rear to front. Such a simple configuration can realize the anti-slip portion 54c of the first finger rest recess 54.

What is claimed is:

1. A battery pack configured to be detachably attached to a battery pack mount of an electrical device by being slid with respect to the battery pack mount, wherein a front direction is defined as a direction in which the battery pack is slid when the battery pack is being detached from the battery pack mount, a rear direction is defined as a direction in which the battery pack is slid when the battery pack is being attached to the battery pack mount, and an up-down direction is defined as a direction orthogonal to a front-rear direction,
   the battery pack comprising:
   a casing having a lower surface and a front surface; and
   a plurality of battery cells housed inside the casing,
   wherein
   a finger rest recess for a user to put a finger in is defined across the lower surface and the front surface of the casing,
   an anti-slip portion configured to prevent the finger of the user from slipping from rear to front is arranged in the finger rest recess,
   the plurality of the battery cells includes a first battery cell arranged frontmost among the plurality of the battery cells,
   the finger rest recess includes a front finger rest recess that is visible when the battery pack is viewed from the front direction, and
   when the battery pack is viewed from below, the front finger rest recess and the first battery cell overlap at least partially.

2. The battery pack according to claim 1, wherein
   no other battery cells are arranged further frontward than the first battery cell,
   the plurality of battery cells further includes a second battery cell arranged lower than the first battery cell, and
   when the battery pack is viewed from front, the front finger rest recess and the second battery cell overlap at least partially.

3. The battery pack according to claim 1, further comprising:
   an engagement member that is held by the casing so as to be movable in the up-down direction and is configured to engage with the electrical device when the battery pack is attached to the battery pack mount;
   an operating member that has an operating surface configured to be operated by the user and is configured to move the engagement member downward when the operating surface is pushed in, wherein the operating surface is exposed to an outside of the electrical device when the battery pack is attached to the battery pack mount; and
   a biasing member that biases the engagement member upward,
   wherein
   the casing further has an upper surface, and
   the operating surface is exposed on the upper surface of the casing.

4. The battery pack according to claim 3, wherein, when the battery pack is viewed from below, the front finger rest recess and the operating surface overlap at least partially.

5. The battery pack according to claim 1, wherein the front finger rest recess includes:
   a finger rest surface extending along the front-rear direction and a right-left direction; and
   a convex portion that is arranged frontward than the finger rest surface and protrudes downward than the finger rest surface,
   wherein the convex portion constitutes the anti-slip portion.

6. The battery pack according to claim 1, wherein
   the front finger rest recess includes a plurality of ribs that protrudes downward, extends in a right-left direction, and is aligned in the front-rear direction, and
   the plurality of ribs constitutes the anti-slip portion.

7. The battery pack according to claim 1, wherein
   the front finger rest recess includes an inclined finger rest surface extending along a right-left direction and inclined upward from its front side to rear side, and
   the inclined finger rest surface constitutes the anti-slip portion.

8. The battery pack according to claim 1, wherein
   no other battery cells are arranged further frontward than the first battery cell,
   the plurality of battery cells further includes a second battery cell arranged lower than the first battery cell,
   when the battery pack is viewed from front, the front finger rest recess and the second battery cell overlap at least partially,
   the battery pack further comprises:
   an engagement member that is held by the casing so as to be movable in the up-down direction and is configured to engage with the electrical device when the battery pack is attached to the battery pack mount;
   an operating member that has an operating surface configured to be operated by the user and is configured to move the engagement member downward when the operating surface is pushed in, wherein the operating surface is exposed to an outside of the electrical device when the battery pack is attached to the battery pack mount; and
   a biasing member that biases the engagement member upward,
   the casing further has an upper surface,
   the operating surface is exposed on the upper surface of the casing, when the battery pack is viewed from below, the front finger rest recess and the operating surface overlap at least partially,
the front finger rest recess includes:
a finger rest surface extending along the front-rear direction and a right-left direction; and
a convex portion that is arranged frontward than the finger rest surface and protrudes downward than the finger rest surface, and
the convex portion constitutes the anti-slip portion.

9. The battery pack according to claim 1, wherein
no other battery cells are arranged further frontward than the first battery cell,
the plurality of battery cells further includes a second battery cell arranged lower than the first battery cell,
when the battery pack is viewed from front, the front finger rest recess and the second battery cell overlap at least partially,
the battery pack further comprises:
an engagement member that is held by the casing so as to be movable in the up-down direction and is configured to engage with the electrical device when the battery pack is attached to the battery pack mount;
an operating member that has an operating surface configured to be operated by the user and is configured to move the engagement member downward when the operating surface is pushed in, wherein the operating surface is exposed to an outside of the electrical device when the battery pack is attached to the battery pack mount; and
a biasing member that biases the engagement member upward,
the casing further has an upper surface,
the operating surface is exposed on the upper surface of the casing,
when the battery pack is viewed from below, the front finger rest recess and the operating surface overlap at least partially,
the front finger rest recess includes a plurality of ribs that protrudes downward, extends in a right-left direction, and is aligned in the front-rear direction, and
the plurality of ribs constitutes the anti-slip portion.

10. The battery pack according to claim 1, wherein
no other battery cells are arranged further frontward than the first battery cell,
the plurality of battery cells further includes a second battery cell arranged lower than the first battery cell,
when the battery pack is viewed from front, the front finger rest recess and the second battery cell overlap at least partially,
the battery pack further comprises:
an engagement member that is held by the casing so as to be movable in the up-down direction and is configured to engage with the electrical device when the battery pack is attached to the battery pack mount;
an operating member that has an operating surface configured to be operated by the user and is configured to move the engagement member downward when the operating surface is pushed in, wherein the operating surface is exposed to an outside of the electrical device when the battery pack is attached to the battery pack mount; and
a biasing member that biases the engagement member upward,
the casing further has an upper surface,
the operating surface is exposed on the upper surface of the casing,
when the battery pack is viewed from below, the front finger rest recess and the operating surface overlap at least partially,
the front finger rest recess includes an inclined finger rest surface extending along a right-left direction and inclined upward from its front side to rear side, and
the inclined finger rest surface constitutes the anti-slip portion.

11. A battery pack configured to be detachably attached to a battery pack mount of an electrical device by being slid with respect to the battery pack mount, wherein a front direction is defined as a direction in which the battery pack is slid when the battery pack is being detached from the battery pack mount, a rear direction is defined as a direction in which the battery pack is slid when the battery pack is being attached to the battery pack mount, and an up-down direction is defined as a direction orthogonal to a front-rear direction,
the battery pack comprising:
a casing having a lower surface and a front surface; and
a plurality of battery cells housed inside the casing, wherein
a finger rest recess for a user to put a finger in is defined across the lower surface and the front surface of the casing,
an anti-slip portion configured to prevent the finger of the user from slipping from rear to front is arranged in the finger rest recess,
the finger rest recess includes a front finger rest recess that is visible when the battery pack is viewed from front, and
when the battery pack is viewed from below, the front finger rest recess and at least one of the plurality of the battery cells overlap at least partially.

* * * * *